Patented July 5, 1938

2,123,078

UNITED STATES PATENT OFFICE 2,123,078

FERMENTATION MASH

John Müller, Philadelphia, Pa., assignor to Commercial Solvents Corporation, New York, N. Y., a corporation of Maryland No Drawing. Application April 30, 1931, Serial No. 534,140

3 Claims. (Cl. 195—99)

The object of my invention is to provide an improved fermentation mash for increasing the yield of solvents, especially butyl alcohol, from such substances as sugar, molasses or other carbohydrate raw material that can be hydrolyzed or inverted.

My invention will be illustrated with reference to fermentations by means of an organism which will hereinafter be referred to by the term "P-bacillus", the designation by which it has been known throughout many months of experimentation and tests, but which has subsequently been designated Clostridium propyl butylicum alpha.

The P-bacillus was originally located in the presence of and incidental to the decay of wood, but it has since been established that it is found with and can be developed upon various woody fibres including sugar cane.

The P-bacillus may be isolated from the usual sources, and especially from material containing rotted wood, by the methods of isolation known to those skilled in the art. For example, the enrichment method of culturing, as disclosed in U. S. Patent No. 1,315,585 by Weizmann, the anaerobic plating method of U. S. Patent 1,537,597 by Freiberg, or a combination of these two methods as disclosed in U. S. Patents 1,538,516 and 1,822,139 by Funk and U. S. Patent 1,545,694 by Waters, may be successfully used. It is to be understood, of course, that in employing these or other methods the usual precautions known to those skilled in the art should be taken. For example, the media used should be those which favor the growth of the P-bacillus, e. g., the media hereinafter disclosed. Likewise, the temperature of incubation and other growth or fermentation conditions should be regulated to favor the development of this organism.

The primary biochemical characteristics of the P-bacillus, which positively identify it as compared with other types of bacilli are as follows:—

1. The P-bacillus ferments glycerol.
2. It does not liquefy gelatin.
3. It does not ferment starch.
4. Neither does it form solvents in corn meal.
5. Milk is not proteolized.
6. It does not require protein nitrogen.
7. It ferments glucose, lactose, maltose, sucrose, xylose and the invert sugars dextrose and laevulose.
8. Its maximum temperature is about 40° C., and its minimum temperature is approximately 30° C., or lower under certain conditions.
9. Its pH value is 6.20–5.00.

The P-bacillus may be more accurately described by the following characteristics:

I. Morphological
  A. Rod-shaped
  B. Spore-forming—Clostridia and Plectridia
  C. Practically indistinguishable from members of the Clostridium butyricum group II. Cultural
  A. Nutrient agar stroke: no growth aerobically or anaerobically
  B. Glucose nutrient agar stroke: no growth aerobically but considerable growth anaerobically—moist, raised, usually white to cream colored; higher alcohol odor changing to butyrous after exposure to air
  C. Colonies on glucose agar: substantially round, raised, usually white to cream colored; higher alcohol odor changing to butyrous after exposure to air
  D. Potato slant: moderate growth, usually white to cream colored; butyrous odor III. Biochemical
  A. Carbohydrate fermentation
    1. Inability to produce appreciable yields of solvents from starch as the only source of carbohydrate
    2. Inability to produce appreciable yields of solvents from sucrose as the only source of carbohydrate
    3. Inability to consistently produce yields greater than 20% calculated on the weight of the sugar from uninverted molasses
    4. Ability to produce high yields of solvents from glucose or inverted molasses
    5. Ability to ferment carbohydrates as evidenced by production of acid and/or gas:

| | |
|---|---|
| Corn starch | − |
| Soluble starch | − |
| Dextrin | − |
| Raffinose | − |
| Sucrose | ++ |
| Maltose | +++ |
| Lactose | +++ |
| Glucose | ++++ |
| Laevulose | ++++ |
| Xylose | ++ |
| Duscitol | − |
| Mannitol | − |
| Glycerol | + |

B. Nitrogen metabolism
   1. Ability to produce high yields of solvents in sugar media containing ammonia as the principal source of nitrogen
   2. Ability to utilize degraded protein (including ammonia) as sole nitrogen source
   3. Inability to utilize undegraded protein as sole source of nitrogen
   4. Inability to liquefy gelatin or to produce more than very slight proteolysis of milk
C. Oxygen requirements
   1. Anaerobic
D. Temperature range for solvent production
   1. From 25° C. to 36° C., preferably 28° C. to 32° C.
E. Hydrogen ion concentration for solvent production
   1. Final pH of 5.0–6.5, preferably 5.8–6.1.

P-bacillus ferments freely, and the best results, that is, the most satisfactory yields are obtained from the monohexoses or simple sugars. Sucrose, a double sugar or disaccharide, is attacked relatively slowly and must be inverted before being used,—dextrose and laevulose resulting therefrom. On invert sugar the bacillus yields from 25%–30% of total solvents, of which butyl alcohol is the major constituent.

This improved result is secured by the combination of fermentation conditions which has now been discovered and which is provided by my improved fermentation mash, i. e., a limited amount of nitrogen in the form of ammonium compounds, and an excess of calcium carbonate, or any other insoluble non-toxic metal carbonate. At this point it should be noted that P-bacillus is able to utilize and preferably should have ammonia nitrogen, whereas other butyl forming organisms require protein nitrogen as a nutrient.

In the use of P-bacillus for producing butyl alcohol from sucrose or molasses, inversion of sucrose has been found to be essential, the fermentation without inversion being far too slow and incomplete for commercial purposes. Inversion as a prerequisite to fermentation may be carried out by means of acids or by invertase, or any other inverting enzymes. When acids are employed, a certain amount of ammonia water is used to subsequently neutralize the acids, and there is also added a slight excess of calcium carbonate over that required to neutralize any remaining acidity. The initial pH values should be adjusted to 6.20–5.00, and for successful fermentation of these media, nitrogenous and mineral nutrients must be present. Protein nitrogen is left unattacked, but ammonia nitrogen is used up freely, serving as an excellent nutrient. Phosphorous, which may be present in the medium, or which may be added in the form of phosphates is also essential for the development of the organism. Successful fermentations are obtained in solutions of from 4%–6% of glucose or of invert sugar in molasses of about 10° Brix, but higher concentrations than 6% of sugar also give good results. Fermentations last about forty-eight (48) hours.

P-bacillus forms very motile short plump rods, which may occur either singly, in pairs or in chains. Upon further development they change to Clostridia, at which stage the formation of solvents begins. First hydrogen, carbon dioxide, and acids are formed, followed by the formation of butyl alcohol and acetone, with a trace of ethyl alcohol. Sporulation sets in at the end of fermentation.

By way of illustrating one method by which the process is carried out, I will assume that I have 1000 gallons of mash having a sugar concentration of from 4%–6%, such as glucose. As the organisms do not ferment in pure glucose solutions, in order to obtain results of any commercial value, certain nourishing substances must be added to the mash to be fermented. The following chemicals are added as nutrients and stimulants:—About 8 pounds of commercial ammonium sulphate, about 10 pounds of ammonium, sodium, calcium, or any other phosphate, and about 20 pounds of commercial or cheap calcium carbonate. This amount of neutralizing agent should give an initial hydrogen ion concentration of pH 6.20–5.00. After adding these chemicals or their equivalents to the mash, the latter is inoculated with the required amount of seed mash which has been prepared from previously sterilized mash. The inoculated mash is then incubated at 32° C.

The final or main mash need not be sterilized, if the organism is used when young and many motile vegetative cells are present. Of course, yields will usually be greater if the final mash also can be sterilized.

From 1%–2% seed is sufficient for a vigorous fermentation. Fermentation begins within from one to two hours, with ensuing gas liberation and increase in acidity. After about 20 hours of fermentation cell growth begins to drop off, the odor of solvents can be detected and at this point acidity begins to diminish, indicating that the fermentation is proceeding normally. Fermentation will last about forty-eight (48) hours.

After fermentation is completed, the solvents are separated from the fermented mash by distillation. Yields of from 25%–30% of solvents on the basis of total sugars are obtained.

This highly desirable result is caused and insured by using a slight excess of calcium carbonate in the mash to regulate the hydrogen ion concentration during fermentation, and providing the organism with a limited amount of ammonia nitrogen. Protein nitrogen is not required for its development.

The foregoing procedure is varied as follows for the use of sucrose, which unlike glucose must be inverted. Inversion is accomplished by wellknown or accepted methods, such as by the use of suitable acids or invertase. In case of inverting with acids it is necessary to neutralize, or to adjust pH. to 6.20. This is done by adding from about one-half to one gallon of ammonia water (about 28% $NH_3$) depending upon the amount of acid used for the inversion, about 10 pounds of ammonium, sodium, calcium, or any other phosphate, and about 25 pounds of calcium carbonate. Calcium hydrate, or any other non-toxic metal carbonate or hydrate, is suitable to adjust pH. to 6.20, but calcium carbonate or some other non-toxic metal carbonate should be present in slight excess. If invertase is used for the inversion, as much neutralization is not required because the acid is eliminated and only acids resulting from breaking up of stimulating salts need to be neutralized. Results in either case are substantially the same as in the case of glucose mashes.

Any other raw materials, such as invert sugar, xylose, etc. and including such materials as maltose, lactose, molasses and sawdust, or other materials which can be hydrolyzed or inverted by known methods into simpler sugars, can be successfully fermented with excellent solvent yields by following the herein described basic method, modified somewhat where or when necessary, depending upon the particular material being fermented.

In the appended claims the term "ammonia nitrogen" is intended to embrace the use not only of ammonia but also ammonium compounds.

Having thus described my invention, what I claim and desire to protect by Letters Patent of the United States is:—

1. A new composition of matter comprising, essentially, an aqueous solution of a mono-hexose sugar in a concentration of 4–6% by weight containing approximately 0.1% by weight of an ammonium salt, approximately 0.1% by weight of a phosphoric acid salt, and an insoluble alkaline reacting metal carbonate in a concentration of the order of 0.2%, by weight, in excess of that required to adjust the hydrogen ion concentration of the composition to a value of approximately pH 6.2.

2. In a sugar fermentation mash containing as nutrients ammonia nitrogen and a phosphate, the improvement which comprises, as an additional ingredient, a non-toxic insoluble alkaline reacting metal carbonate in a concentration slightly in excess of that required to neutralize any initial acidity of the mash.

3. In a mono-hexose fermentation mash containing as nutrients ammonia nitrogen and a phosphate, the improvement which comprises, as an additional ingredient, calcium carbonate in a concentration of the order of 0.2% by weight, based on the total weight of the mash, in excess of that required to adjust the hydrogen ion concentration of the mash to a value of approximately pH 6.2.

JOHN MÜLLER.